UNITED STATES PATENT OFFICE.

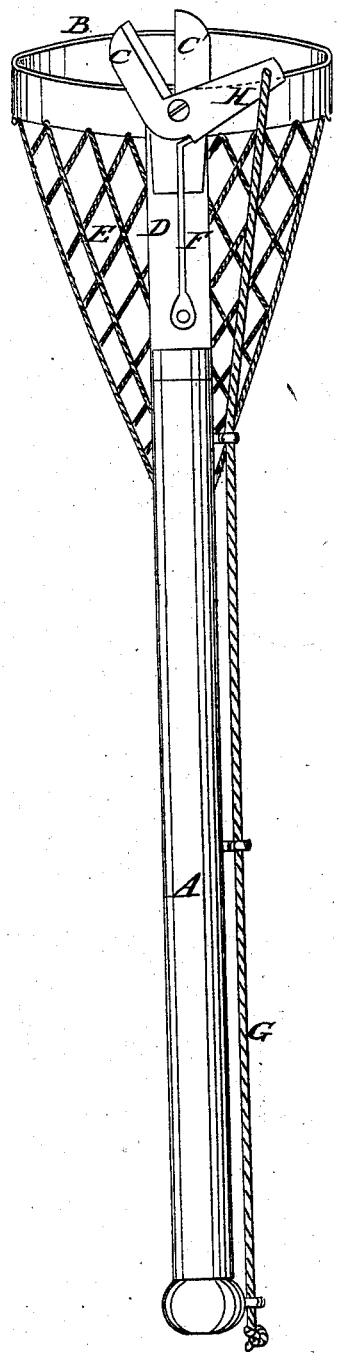

BENJAMIN C. PHELPS, OF WEATHERSFIELD, ASSIGNOR TO HIMSELF AND FREDERICK H. WILLIAMS, OF HARTFORD, CONNECTICUT.

IMPROVED FRUIT-PICKER.

Specification forming part of Letters Patent No. 47,364, dated April 18, 1865.

*To all whom it may concern:*

Be it known that I, BENJAMIN C. PHELPS, of Weathersfield, county of Hartford, and State of Connecticut, have invented certain new and useful Improvements in Fruit-Pickers; and I do hereby declare that the same is described and represented in the following specification and drawing, and to enable others skilled in the art to make and use the same I will proceed to describe its construction and operation.

In the accompanying drawing is shown a side elevation of my improvement, the nature of which will be fully comprehended in the specification and drawing. I will, however, state that the object of this improvement is to preserve both the fruit and branches of the tree from injury to which they are liable, as is the case by the ordinary mode of plucking.

A is a pole, made of any desired or suitable length to reach the fruit which it is desirable to pick.

B is a ring, made of metal or other desirable material.

E is a bag, made of vegetable material, of such shape and length as may be desirable, which is secured to the said ring B. This ring is secured to the clipper-shank D, and by means of this shank D the whole device is secured to the upper end of the pole A, so that the edge of the ring will occupy about a right-angle position with the pole.

C C' are clipper-blades, one of which, C', is formed on the upper end of the shank D. The blade C is provided with an arm or lever, H, formed in nearly a right-angle shape from the joint or lower extremity of the blade, and are secured (the blade and lever) to the shank D or the lower extremity of the blade C' by means of a screw or rivet in the usual way.

F is a spring, secured to the shank or pole just below the lower end of the blade by screws or rivets. The upper end of this spring is so fixed to the lower extremity of the (blade C) joint as to hold it in an open position ready for use.

G is a cord, attached to the outer end of the lever H, and secured along down by the side of the pole, so as to be easily reached at the lower end thereof.

It hardly seems necessary to remark or attempt to further describe the operation of this device, because of its complete simplicity.

It will also be evident that great advantage is gained by the use of this improvement over other means now in use for gathering fruit from the tree or vine. All necessity or liability of injury to the tree or vine is avoided, because you have only to elevate the device by the pole so as to bring the ring B directly under the fruit and the open clipper-blades C C' astride the stem of the fruit, and pull the cord G, when the fruit will be severed from the tree or vine and drop into the sack E, without in any way disturbing or injuring either the fruit or the branch of the tree or vine.

I have thus endeavored to show the nature, construction, and operation of this improvement, so as to enable a person skilled to make and use the same therefrom.

I claim—

A vertical blade, C', upon the shank D, in combination with the vibrating spring-lever blade F H C, basket B E, handle A, and cord G, when constructed and arranged substantially as described.

BENJAMIN C. PHELPS.

Witnesses:
E. R. BURNHAM,
JEREMY W. BLISS.